Jan. 8, 1946.　　　M. J. LARSEN　　　2,392,486
MACHINE TOOL
Filed Oct. 20, 1943　　　3 Sheets-Sheet 1

INVENTOR.
MELVIN J. LARSEN,
BY
ATTORNEY.

Jan. 8, 1946.　　　M. J. LARSEN　　　2,392,486
MACHINE TOOL
Filed Oct. 20, 1943　　　3 Sheets-Sheet 2
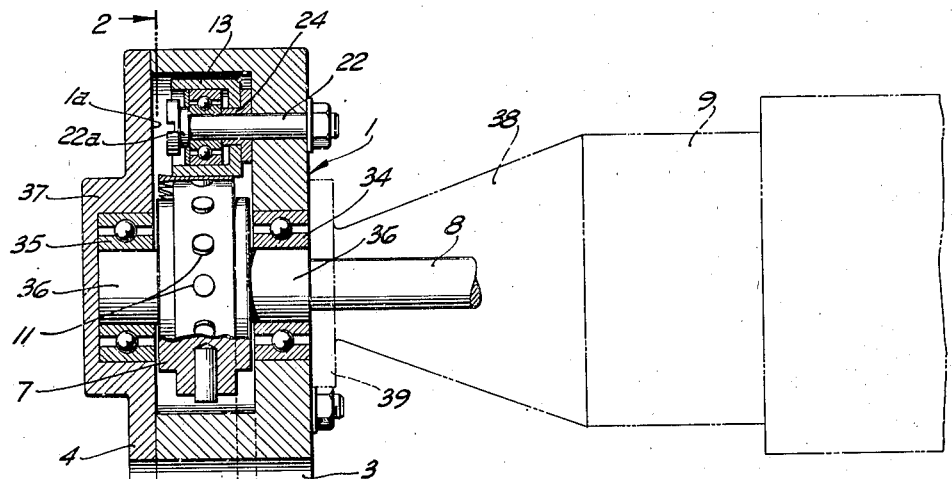
FIG. 4.
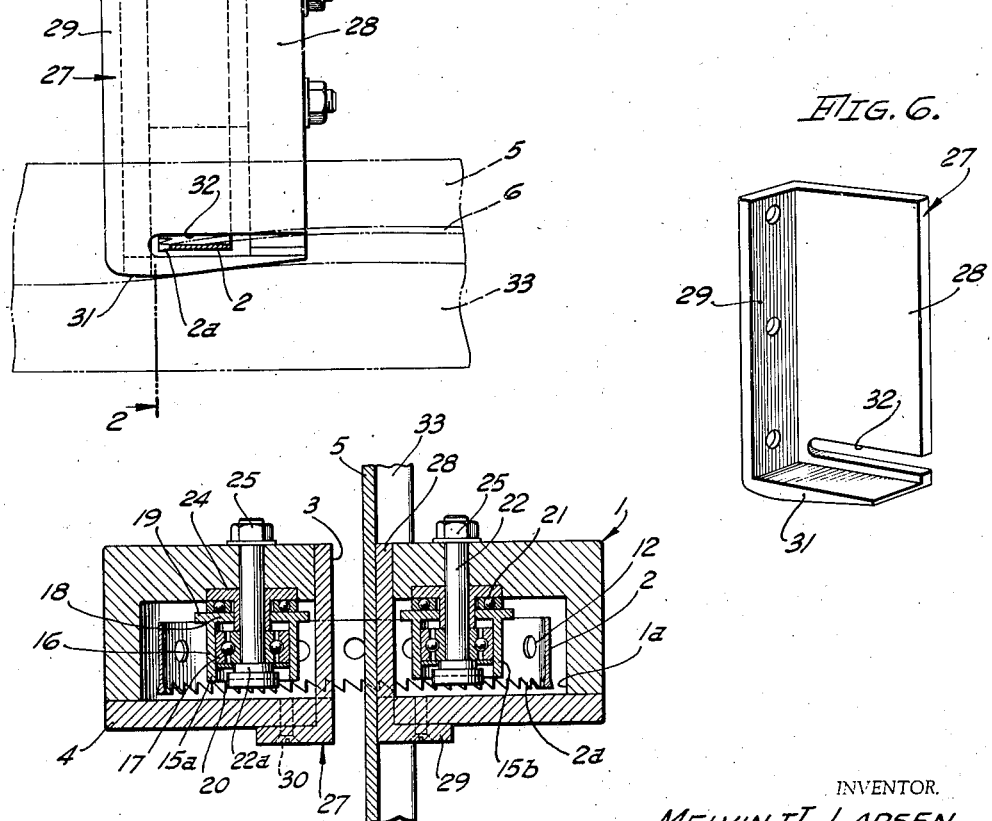
FIG. 6.
FIG. 5.
INVENTOR.
MELVIN J. LARSEN,
BY
ATTORNEY.

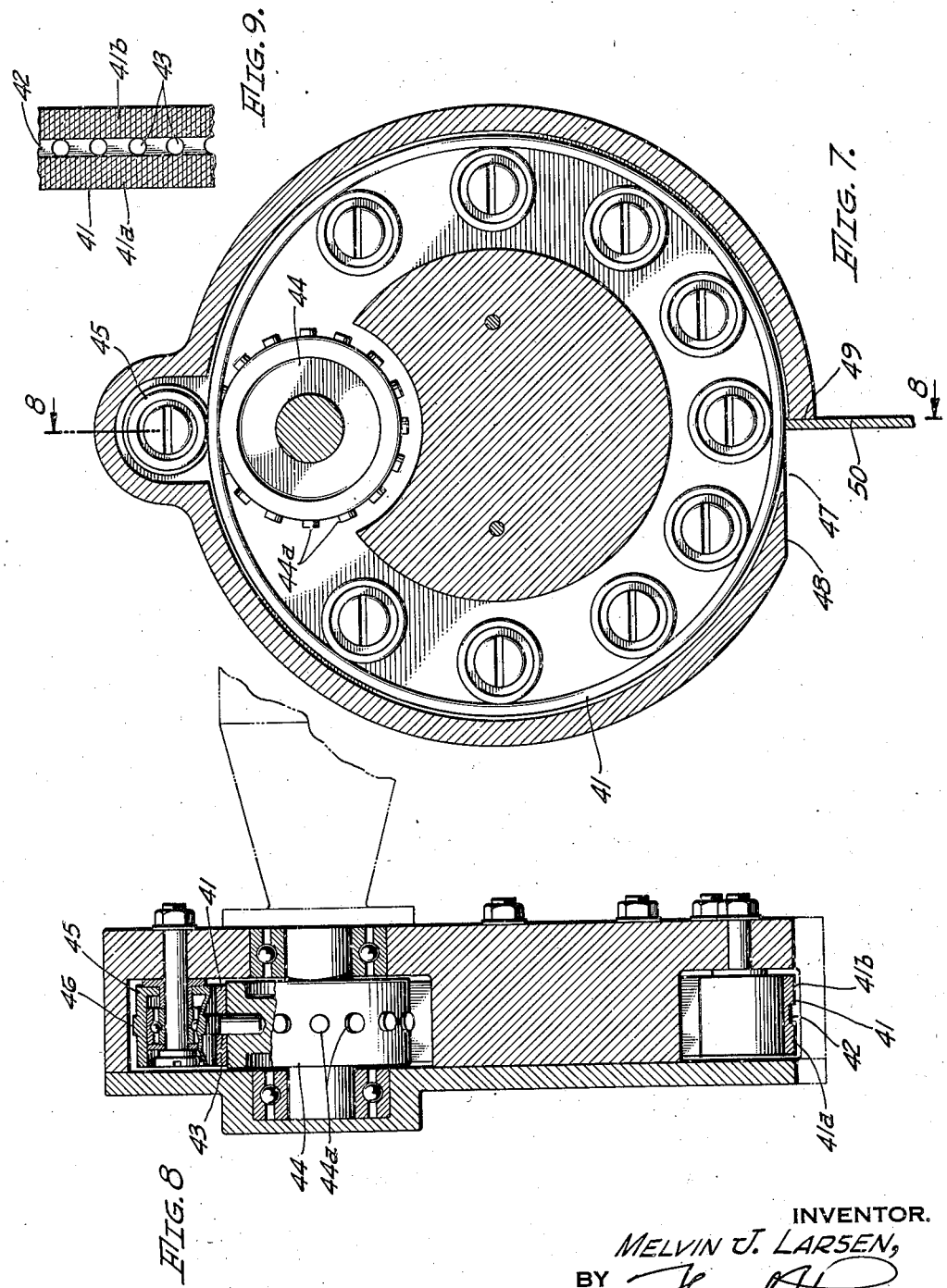

Patented Jan. 8, 1946

2,392,486

UNITED STATES PATENT OFFICE 2,392,486

MACHINE TOOL

Melvin J. Larsen, Inglewood, Calif.

Application October 20, 1943, Serial No. 506,971

4 Claims. (Cl. 29—76)

This invention relates generally to machine tools, and more particularly to machine tools for performing edge trimming or smoothing operations on sheet material.

In accordance with usual machine shop practice, when it is required to operate upon the edge of a long work piece such as a long piece of stout sheet material, the operation usually must be performed by means of a long shearing machine, a plane, or similar machine, as long or longer than the work piece.

One of the objects of this invention is to produce a small compact machine capable of performing a machine operation upon a work piece along a continuous line, for example, to trim the edge of the piece or to dress down or smooth the edge of such a part.

The invention may be embodied in a stationary machine, past which the work piece can be moved, but in the present specification, the invention is illustratively described as applied to a portable hand tool.

In practice, it is also sometimes necessary to trim sheet material along a wavy line, that is to say, along a line that is not straight, but irregular or curved to some particular design. An ordinary shearing machine or press is ill-adapted for performing such a special operation. One of the objects of this invention is to produce a machine tool that is particularly adapted for performing such an operation, and which can perform such an operation even upon plate material of considerable thickness.

Another object is to produce a portable machine tool capable of cutting sheet material readily into strips regardless of the length of the material, and without necessitating clamping the sheet in a fixed position to perform the operation.

The invention provides a circular rotary tool, rotating in a plane at right angles to the plane of the plate material that it cuts, and also at right angles to the direction of advance, or relative movement of the tool with respect to the work piece or plate upon which it is operating. The rotary tool, for instance, a comparatively rigid circular band saw, is housed within a preferably substantially circular casing, which is provided with a substantially radial slot or throat across which the tool passes. The portion of the material to be operated upon is received within this throat while it is trimmed or dressed by the tool.

One object of the invention is to provide improved means for supporting and driving such a tool.

Another object of the invention is to improve the general construction of a portable or hand-supported machine tool of the type mentioned.

Further objects of the invention will appear from the following description of certain typical preferred embodiments thereof.

Figure 2:
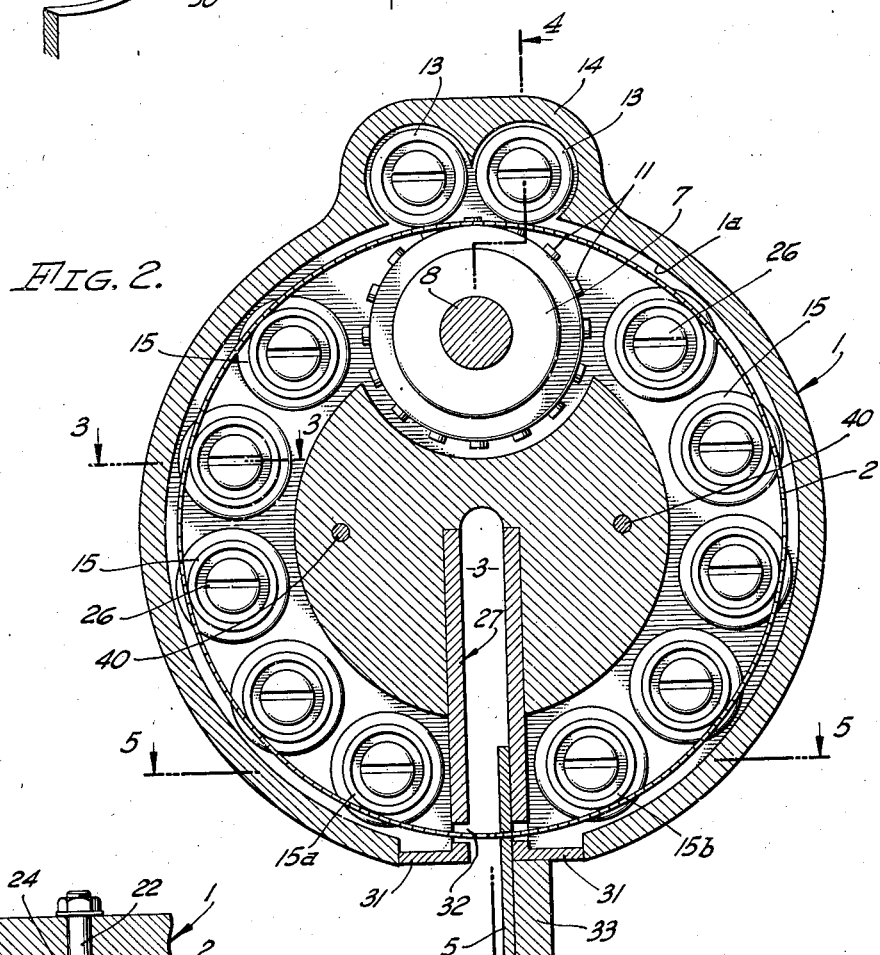
Fig. 2 is a vertical section through the housing or casing of the machine taken about on the line 2—2 of Fig. 4, that is to say, in a plane substantially parallel to the plane in which the tool element of the machine rotates.
Figure 3:
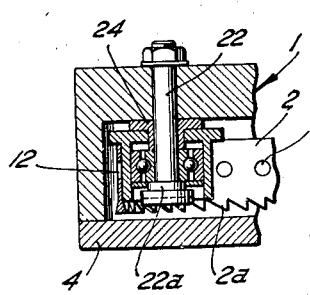
Fig. 3 is a fragmentary view and is a horizontal section taken about on the line 3—3 of Fig. 2. This view illustrates a typical construction for guiding and supporting the rotary tool element.

Fig. 4 is a vertical section taken about on the broken line 4—4 of Fig. 2 and passing above through a portion of the guiding means that cooperates with the driving element of the machine, and passing below down through the slot or throat of the machine that receives the edge of the work piece or plate. This plate or work piece is indicated in dotted lines. The motor casing is indicated in dotted outline;

Fig. 5 is a fragmentary view and is a horizontal section taken about on the line 5—5 of Fig. 2 to illustrate details of a preferred guide means for the tool element that have a special feature of construction adapting them to cooperate with the tool element adjacent the point where the tool element operates upon the work;

Fig. 6 is a perspective of a face plate or guide. In the machine illustrated, two of these guides are employed as liners or check pieces for the sides of the slot or throat that receives the edge of the work;

Fig. 7 is a view similar to Fig. 2, but illustrating a modification of the drive from the motor and also illustrating the employment of a dressing tool or file instead of a tool element with cutters or teeth such as shown in Figs. 2 and 3. This view also illustrates a modification of the receiving slot to adapt the machine for performing this special function;

Fig. 8 is a vertical section taken about on the line 8—8 of Fig. 7 further illustrating details of the parts illustrated in Fig. 7; and Fig. 9 is a face view of a segment of the cutting tool of the form of the invention shown in Figs. 7 and 8.

Referring now to Figs. 1 to 6, inclusive, in which the invention is shown as embodied in the form of a band saw for cutting sheet metal and the like, the machine includes a housing or casing 1 that is preferably of substantially circular form and is formed in one face with an annular channel 1a adapted to receive a rotary tool element 2 comprising a band of annular form, and which preferably is of sufficient thickness to be comparatively rigid for its diameter, as for example, .064" in thickness for a typical diameter of 3" in the case of a saw. In other words, the band has sufficient thickness for its diameter, e. g., .064" for a diameter of 3", that it forms a substantially rigid annulus which will elastically resist deformation from its circular form. The forward edge of this band is provided with suitably formed saw teeth 2a. This band travels across a recess which in the present instance is in the form of a slot or throat 3 that extends into the housing from its periphery in a substantially radial direction; and this slot is formed in the cover plate 4 applied to the channelled face of the housing as well as in the body portion of the housing.

Figure 1:
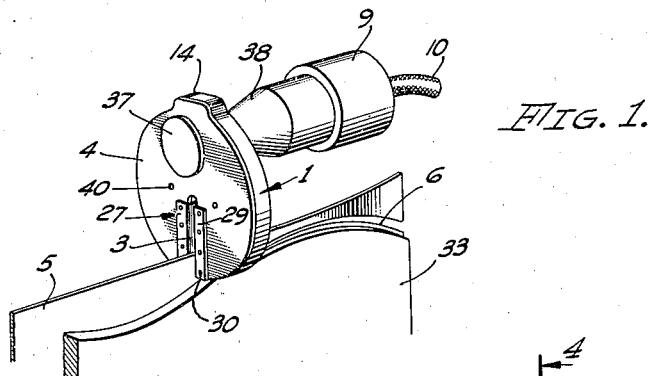
Fig. 1 is a perspective of a machine tool embodying the invention and capable of being held in the workman's hand when applying the same to the work such as a plate.

The slot 3 operates as a throat to receive the edge of the "work" or work piece such as a long plate 5 to which the machine may be applied. In Fig. 1 the tool is illustrated as having made a cut 6 extending into the plate from its end, the portion of the plate to be trimmed away being shown as received within and passing through the described throat.

The tool element 2 is rotated on its own axis by a driving wheel 7 which is integral with a motor shaft 8 that extends into the casing or housing from a motor such as a compressed air motor, or an electric motor 9 operated by current carried to it through an electric cord 10.

The drive from the driving wheel 7 to the tool element is preferably a positive drive that is effected by providing the wheel with circumferentially spaced teeth or spurs in the form of short pins 11 receivable in sockets which in the present instance are in the form of round holes 12 punched through the band 2 and spaced equidistant to correspond with the pitch of the driving pins 11 (see Fig. 3).

Bearers preferably in the form of two rollers 13 are mounted adjacent to the driver 7 but on the outer side of the tool element to assure proper engagement between the pins 11 and the sockets. These bear rollers 13 are mounted in a chamber in a projection or abutment 14 extending out from the body of the housing.

A plurality of guiding means, in the form of circumferentially disposed rollers 15 is provided for the inside surface of the circular cutting tool. These rollers are all alike and mounted alike except the two bottom rollers 15a and 15b (see Fig. 2). These two rollers 15a and 15b and their mountings are shown in detail in Fig. 5. Each includes a cylindrical body or cup 16 with a centering roller or ball bearing 17 within it, and the head 18 or bottom wall of the cup has a projecting flange 19 to take the thrust of the rear edges of the tool element when the toothed edge 20 is operating upon the "work." Provided in back of the head 18 is a thrust bearing 21, preferably in the form of a thrust ball bearing.

The upper rollers are here illustrated as including four on each side, and these are shown as having substantially the same construction as that illustrated in Fig. 5 except that no thrust bearing is necessary for them. Each of the rollers including the rollers 13 is mounted on a stud or arbor 22 that is carried in the body of the casing 1, and is provided at its inner end with a head 22a for clamping the inner ball race of each centering bearing 17 up against the end of a bushing 24 when the nut 25 on the outer end of the stud is tightened up. The end face of each stud 22 may be provided with a screw driver slot 26 for holding the stud against rotation when its nut is being tightened up.

The sides of the slot 3 are preferably provided with cheek pieces or clips 27, one on each side, and the preferred form for which is best shown in Fig. 6. Each of these clips has a plate-like body 28 that is slipped into place in the slot 3 from the front (see Fig. 5), and is formed with a right angle flange 29 which is secured to the outer face of the cover 4 by means of small fasteners such as machining screws 30. Each clip is also provided with a bottom flange or skid 31 that operates as a runner to slide along on a template or guide as will be presently described. This runner may be tapered in thickness so that it has its greatest thickness toward the forward end of the skid. Each clip body 28 is provided with a clearance slot 32 for the tool element; this permits the clip to be slid into position from the front as the slot 32 extends in from the rear edge of the clip body 28.

In Fig. 4, the bearings 34 and 35 for the motor shaft 8 are illustrated. The motor shaft is preferably formed adjacent each side of the wheel 7 with enlarged sections 36 which are received by these bearings. These bearings are preferably roller, or ball bearings as shown, the former being set into the rear wall of the casing, and the latter being housed in a circular boss 37 that projects out from the forward face of the cover.

The housing for the motor 9 may have a tapered or conical neck 38 with a flange 39 on its end for bolting it to the side of the casing 1. This is illustrated in Fig. 4, but the attaching bolts are not illustrated. The cover 4 may be attached to the body of the casing by means of through bolts such as the bolts 40.

The use of the machine as thus described is illustrated in Fig. 1. The plate 5 whose edge is to be trimmed is provided with a template 33, of any desired contour or outline, and the skid 31 is slid along this template, with the portion of the material to be cut away being received in the radial slot or throat 3, while the circular band blade 2 makes its cut 6. The template is of course located below the line to be cut by a distance equal to the distance from the saw blade to the bottom of the skid 31. The tool may then be easily slid and guided along the template, with assurance that the cut will be made at the exact predetermined line. Obviously, the thickness of the piece that is cut away is limited by the depth of the slot 3, which accordingly is extended radially well into the housing in the case of a saw, preferably to approximately the center thereof. In a typical embodiment, the saw blade is of a diameter of approximately 3", so that a piece of a width of approximately 1½" may be trimmed from the edge of a plate. Obviously, the tool may be made larger or smaller in diameter to suit the type of work in hand.

The invention may be embodied in a machine tool for operating a tool element that is not necessarily of the kind illustrated in Figs. 1 to 6. For example, I may construct the substantially annular casing 1a of the tool as illustrated in Figs. 7 to 9, this casing being seen to be generally similar to that of the previously described embodiment, and the tool element in this case may be a file 41 of circular band form, with two abrading faces 41a and 41b, and with an intermediate zone 42 of less thickness than the ends of the band as viewed in cross-section. The band should in this instance be somewhat thicker than the saw tool; for instance, about so as to provide a comparatively rigid file. The zone 42 is formed with the sockets or openings 43 to receive the driving pins 44a on the driving wheel 44. In this case a single bearer roller 45 is provided outside the band, and has a middle zone of larger diameter than the end portions of the rollers. This enlarged portion 46 runs in the middle groove of the band at 42.

At the diametrically opposite point the housing or casing 1a has a recess or slot or throat 47 that extends all the way across the width of the casing and inwardly toward the center of the annular casing sufficiently to expose the cutting teeth on the band. One side of this slot or throat 47 has a beveled face 48 lying in a plane substantially at right angles to the radius line passing to the opposite edge 49 which is disposed in a substantially radial plane and operates as a guide or positioning shoulder for one side of the work 50 that is being held against the file. In other respects, the construction of this power-operated filing tool is substantially the same as that of the tool illustrated in Figs. 1 to 6. This power-operated file affords means for very rapidly dressing down or smoothing an edge of a plate.

It is obvious that many variations in design, structure and arrangement can be made without departing from the spirit of the invention, or the scope of the appended claims.

I claim:

1. A machine tool for performing a machine operation upon a work piece embodying: a housing with a slot extending into the same to serve as a throat to receive a work piece; a cutting tool enclosed within said housing comprising a circular band formed with uniformly spaced sprocket holes extending therethrough, and having on its outer periphery circumferential abrading faces on opposite sides of said sprocket holes; a plurality of guide rollers mounted in a circumferentially spaced circular disposition in said housing, said guide rollers engaging the inside surface of said circular band and supporting and guiding said band for rotation inside said housing and transversely across said slot; a sprocket rotatably mounted within said housing in peripheral engagement with one face of said band for engagement between the sprocket teeth thereof and said sprocket holes of said band; and idler roller means mounted within said housing engaging the other face of said band opposite the place of engagement between said sprocket and said band.

2. A machine tool for performing a machine operation upon a work piece embodying: a housing with a slot extending into the same to serve as a throat to receive a work piece; a cutting tool enclosed within said housing comprising a circular band; guides for said circular band within said housing supporting it for rotary movement on its axis and for travel transversely across said slot; a drive wheel for said band mounted inside said housing in peripheral engagement with one face of said band; a rotatable shaft carrying said drive wheel and projecting outside said housing; and a drive motor housing secured to said housing around the projecting portion of said shaft, said motor housing being adapted to form a handle enabling said machine tool to be operated as a hand tool.

3. A machine tool for performing a machine operation upon a work piece embodying: a housing embodying a substantially circular disc-shaped block formed with a recess sunk in one side face thereof, and a cover plate mounted adjacent said face and closing said recess, said block and cover plate formed with a slot extending inwardly from the periphery thereof to form a work receiving throat; a cutting tool comprising an annular band disposed within said recess; a plurality of circularly arranged circumferentially spaced guide rollers mounted in said recess and engaging the inner face of said band; a band engaging sprocket wheel mounted inside said housing with its periphery tangent to said band at a point substantially diametrically opposite the location of said throat; a drive shaft for said sprocket having portions projecting oppositely therefrom; a bearing for one projecting portion of said shaft carried by said cover plate and a bearing for the other projecting portion of said shaft carried by said housing, with said last-mentioned shaft portion projecting therethrough and beyond said housing; and a drive motor housing secured to said housing and surrounding said last-mentioned projecting shaft portion.

4. A machine tool for performing a machine operation upon a work piece embodying: a housing with a slot extending into the same to serve as a throat to receive a work piece; a cutting tool enclosed within said housing comprising a circular band; guides for said circular band within said housing supporting it for rotary movement on its axis and for travel transversely across said slot; a drive wheel for said band mounted inside said housing in peripheral engagement with one face of said band; a rotatable shaft carrying said drive wheel and projecting outside said housing; and a power unit housing extending from said first-mentioned housing around the projecting portion of said shaft, said power unit housing being adapted and formed to comprise a projecting handle enabling said machine tool to be manually applied to the work.

MELVIN J. LARSEN.